Dec. 1, 1970   J. E. OLTMAN   3,544,383
METHOD OF SEALING AN ELECTRIC BATTERY BY MEANS OF SPIN WELDING
Filed Dec. 16, 1968

United States Patent Office 3,544,383
Patented Dec. 1, 1970

3,544,383
METHOD OF SEALING AN ELECTRIC BATTERY BY MEANS OF SPIN WELDING
John E. Oltman, Madison, Wis., assignor to ESB Incorporated, a corporation of Delaware
Filed Dec. 16, 1968, Ser. No. 784,147
Int. Cl. H01m 1/02, 31/00
U.S. Cl. 136—133                                         5 Claims

ABSTRACT OF THE DISCLOSURE

The construction of a battery sealed within a plastic container comprising a plastic can and a plastic top wherein the top is spin welded to the can. While the top is being spin welded to the can, rotatable contact between the terminal in the top and the current collector of one of the battery electrodes is maintained. If the physical properties of the battery electrode permit, the terminal in the top may have an extension projecting down into the electrode and the extension rotates in the electrode during the spin welding operation and serves as the current collector therefor. The peripheral edge of the top is designed to permit a combined radial-butt seam weld to be formed between the top and the can.

BACKGROUND OF THE INVENTION

Throughout the history of the development of both alkaline and LeClanche type batteries, it has been a great concern of the industry to provide a battery construction which would prevent electrolyte leakage from the batteries. The batteries leak electrolyte and other exudate for somewhat different reasons in that the alkaline electrolyte tends to creep along metallic surfaces and eventually leaks from the cell, whereas in a LeClanche battery the zinc reaches such a point of dissolution in the electrolyte that the exudate is able to break through the zinc wall.

There have been many attempts to prevent this electrolyte leakage involving improvements in various sealing techniques. For example, in the past batteries have been sealed using an epoxy-to-metal seal, a ceramic-to-metal bond, or a hard plastic gasket which is interposed between the battery walls and the closure. It has been known to weld metal covers to metal casings. However, in using this method precautions have to be taken to prevent the heat of welding from being conducted to the heat sensitive battery elements.

The use of thermosplastic containers for batteries has not been extensive, having been limited by difficulties in sealing the container satisfactorily. As an example, solvent based adhesives have been used for sealing such containers, but the adhesives are difficult to handle, are slow to dry, and are subject to having solid inclusions, i.e. foreign particles in the adhesive, which can result in an inferior seal. Also, due to evaporation of the solvents in such adhesives, it is possible to have voids form in the seal. Heat welding of the container using hot plate techniques or hot gases has been attempted but is a relatively slow process which often involves manual operation and can be difficult to handle in addition to being subject to solid inclusions which can prevent a good seal from forming.

The present invention provides a sealed battery construction which avoids many of the difficulties present in the prior art techniques of sealing batteries.

SUMMARY OF THE INVENTION

The present invention provides a battery in a thermoplastic container which has been sealed by means of spin welding. The construction of this invention accomplishes the general purpose of having a sealed, substantially leakproof battery. The battery is sealed in a plastic container which possesses the desirable features of being non-corrosive, durable, non-conducting and not as subject to creepage of alkaline electrolyte along its surface as a metal container is. By using polypropylene, a battery construction is provided wherein gases may be vented by passing through the container walls.

Another purpose of this invention is to provide a sealed battery which is easy and inexpensive to manufacture due to the use of the techniques of spin welding which has not heretofore been used in the battery industry and which is not subject to the difficulties and disadvantages of the present methods of sealing batteries. During the spin welding operation, it is an object of the invention to maintain rotatable contact between the terminal in the container top and one of the battery electrodes.

It is also a purpose of the invention to have a particularly shaped top for the container, so that when the top is welded to the can a radial-butt seam weld will form therebetween and as a result, a strong container will be made.

The invention provides a method of spin welding a plastic closure to a plastic battery container and thereby providing an essentially leakproof, self-venting and durable battery construction. Other objects and advantages of this invention will appear in the further description of the preferred embodiments of the invention along with the figures.

DESCRIPTION OF THE PREFERRED EMBODIMENTS

While the following description will relate to the battery constructions shown in the figures, this is not to be viewed as limitative of the scope of invention since modifications of the construction utilizing the basic teaching of the invention are envisioned.

Basically, the container consists of a top, or closure, and a can both of which are thermoplastic and have a metal terminal sealed therein. The elements of the battery are then assembled in the plastic can with one electrode being in contact with the terminal in the bottom of the can. The top is spin welded to the can while the terminal in the top is held in rotatable contact with the current collector of the other electrode so that at the end of spin welding the terminal is in electrical contact with that electrode. If the electrode is a paste of relatively low viscosity, then it is possible to have a current collector project from the terminal in the top into the electrode active material and rotate therein during the spin welding.

The top has a shoulder or flange which rests on the edge of the open end of the can, while the part of the top beneath the flange extends into the can in an interference fit and presses against the inner walls thereof. Because of this construction of the top, a combined radial-butt seam weld between the top and the can is achieved which results in a strong and effective battery container.

Figure 1:
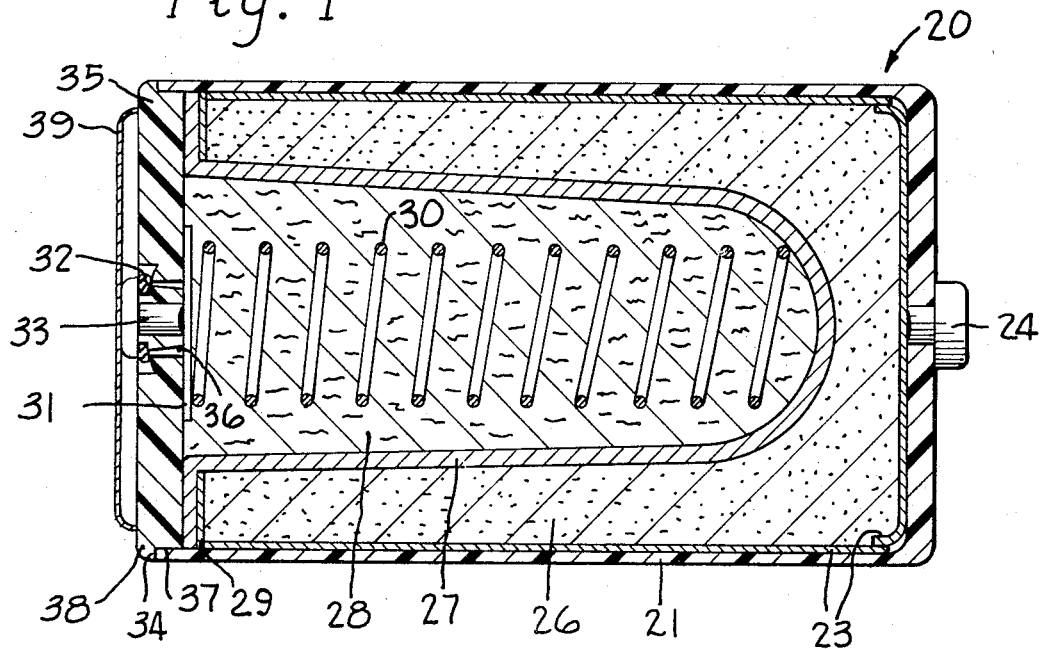
FIG. 1 is a cross sectional view in elevation of a battery housed within a sealed plastic container of this invention; and, FIG. 2 is a cross sectional view in elevation of an alternative construction of this invention.

Referring to FIG. 1, there is shown a battery within a plastic container which has been sealed by spin welding. The battery is shown as 20 and the battery elements are housed in a plastic can 21. Lining the bottom and inner walls of the can 21 is the positive current collector 23 which is spot welded to the terminal 24 sealed in the bottom of the can 21. The positive electrode 26 is shown packed into the can and contacting the current collector 23. A separator 27 separates the positive electrode 26 from the negative electrode 28. An electrolyte permeates the two electrodes and the separator but is not shown in the figure. A current collector, in the form of a helical spring 30, is shown in the negative electrode 28 and is in contact with the contact plate 31 which in turn is spot welded to the negative terminal 33 sealed in the plastic top 35. A metal cover 39 covers the terminal 33 and is the contact terminal for connection to an external circuit.

The battery elements have been sealed within the plastic container by spin welding the top 35 to the can 21. The top is designed so that prior to spin welding it snaps down into the open end of the can in an interference fit and has a flange or shoulder 38 which rests on the edge of the open end of the can while the lower portion 37 of the top inside the can presses against the inner walls of the can. By having this particular shape of the top forming an interference fit with the can, good alignment of the top and the can for spin welding is achieved. Another advantage of this close fit is that once the top is placed on the can, the battery is in a tight container and no atmospheric contaminants are able to reach the battery elements. Preferably, the top is rapidly rotated with respect to the stationary can and the frictional heat caused by the surfaces of the top rubbing the can surfaces causes the plastic of the contacting surfaces to melt and fuse. Therefore a butt weld is formed between the undersurface of the shoulder 38 and the edge of the open end of the can, as well as a radial weld being formed between the lower portion 37 of the top and the inner walls of the can. Thus welding takes place in the areas 34 and 37. Due to this preferred shape of the top which enables a maximum area of welding to occur along several surfaces, a combined radial-butt seam weld is formed which exhibits great strength and has withstood pressures great enough to cause the can 21 to deform. Although a large amount of frictional heat is produced in the areas where welding takes place, this heat is not conducted to the heat sensitive elements of the battery due to the low heat conductivity of the plastic. This is a desirable advantage of this method of sealing a battery.

It is an important feature of this invention that the top 35 is spin welded to the can 21 while electrical contact is maintained between the negative terminal 33 and the negative current collector 30. This is achieved as a result of the fact that at all times during the spin welding, the contact plate 31 is kept in rotatable contact with the resilient current collector 30. The importance of maintaining this rotatable contact is underscored when one considers the problem inherent in spin welding a top to a cylindrical can with the requirement that the contents of the can be electrically connected to a part of the top during the spin welding and yet not be disturbed by the rotational action of the top. If at the end of the spin welding a good internal electrical connection between the negative terminal 33 and the negative electrode 28 is not achieved, the battery may not possess its proper potential and may even fail.

Venting of gases formed within the battery is achieved by vent holes 36 and the vent washer 32. If the container is made of polypropylene, the vent holes and vent washer may be eliminated since gases are able to be vented through the container walls as explained in further detail elsewhere in this description.

The basic principles of this invention have ben described without indicating the materials which make up the various battery elements. It has been stated previously that the battery construction disclosed herein is applicable to both alkaline and LeClanche type batteries, which can be either primary or secondary.

This invention clearly is not limited to alkaline and LeClanche batteries since the materials used in the battery will depend on the type of battery one wishes to construct and to seal in the plastic container. Thus, by way of example, the battery elements of this invention may comprise various electrode materials such as manganese dioxide, zinc, silver, nickel, cadmium, lead and mercury. It is preferable that the container be cylindrical since this shape is most suitable for spin welding. The method of this invention can be adapted to non-cylindrical batteries where a non-circular top is to be spin welded to a non-circular can using a spin welding machine which can be stopped when the top is in proper alignment with the can.

Figure 2:
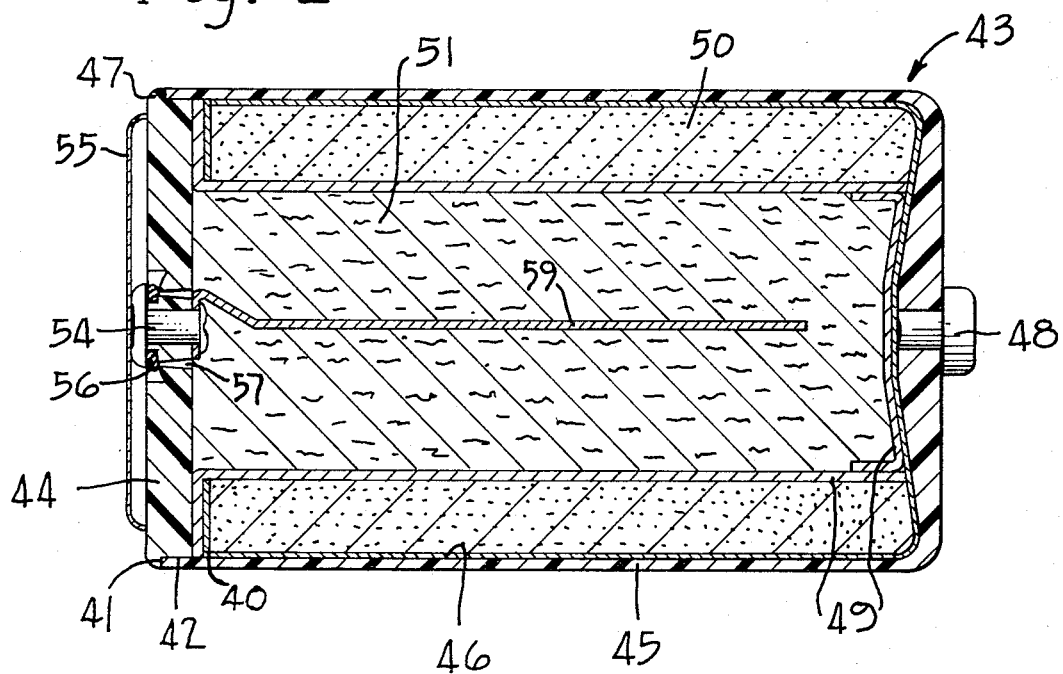

FIG. 2 illustrates another sealed battery having a plastic container of this invention. The battery 43 is housed within a plastic can 45 along the bottom and inner walls of which is the positive current collector 46. A terminal 48 is sealed in the bottom of the can 45 and is spot welded to the positive current collector 46. A separator 49 separates the positive electrode 50 and positive current collector 46 from the negative electrode 51. An electrolyte permeates the two electrodes and the separator but is not shown in the figure.

The plastic top 44 has the preferred shape as discussed previously and has been spin welded to the can 45 to form a combined radial-butt seam weld whereby welding occurs in the areas 41 and 42. Shown sealed in the top 44 is a terminal 54 under a cover 55 which is attached to the top and serves as the terminal contact for connection to an external circuit. A vent washer 56 and vent holes 57 are shown about the terminal 54 and serve to vent gases formed within the battery. As stated during the discussion of FIG. 1, the vent holes and vent washer may be eliminated by using polypropylene as the container material.

Attached to the terminal 54, e.g. by spot welding, is a negative current collector 59, which extends into the negative electrode 51. As is evident from the figure there is no rotatable contact maintained between the negative terminal 44 and the negative current collector 59, but rather since the current collector is attached to the terminal, it therefore spins with the top during the spin welding operation. The negative current collector spins within the negative electrode 51 without damaging the electrode. This is possible since the negative electrode 51 used in this battery is a gel of relatively low viscosity, e.g. gelled zinc, which due to its soft, pasty property is able to have a rod, such as the negative current collector, spin therein without damaging the electrode or battery. If the negative electrode were made of a more viscous substance, then an arrangement such as shown in FIG. 1 using a rotatable contact between the negative terminal and the negative current collector would be necessary.

The terminals for the electrodes in both FIG. 1 and FIG. 2 are sealed in the plastic top and plastic can prior to assembling the battery in the can in order to prevent a film of electrolyte from forming between the terminal and the plastic. If a film of electrolyte formed between the terminal and the plastic, which could occur if the terminals were inserted in the plastic after the battery was assembled, then a leakage path would exist and the battery container may leak electrolyte around one or both terminals. In practice these terminals are forced into holes in the top and the can under an interference fit to provide the proper sealing effect.

The plastic material used for the battery container is preferably polypropylene, although other suitable materials include polyethylene, nylon, styrene polymers such as ABS, and vinyl polymers such as polyvinyl chloride. The same plastic material is normally used for both the top and the can, although different materials which have melting points within a short range of each other can also be used satisfactorily.

Preferably the polypropylene can has a wall thickness of 0.030 inch and has the desirable feature of having a built-in gas venting means. This is brought about by the fact that should gas pressure within a battery in a polypropylene container build up to a value of about 200 p.s.i., then stress orientations appear in the polypropylene can to the extent that gas can escape quickly through the walls of the can. Although gas is able to escape, no electrolyte is able to pass through the walls so that after the pressure has been relieved, the polypropylene can will be somewhat deformed although it can still serve as the battery container and will not leak electrolyte. This automatic venting feature of the polypropylene can is an obvious advantage in using this material and permits the elimination of separate vent holes as mentioned previously.

In the following example the assembly of a battery of FIG. 2 is described wherein the spin welding technique of this invention is used to seal the battery. It is important to keep in mind that three parameters are involved in spin welding, i.e. rotational speed, pressure and time, and that these may vary from one plastic material to another. The spin welding machine is only broadly described since the design of the machine is not important to this invention.

EXAMPLE

Referring to FIG. 2 a polypropylene (Avisun 4018) can 45 was lined with a drawn steel positive current collector 46. A conventional positive electrode mix 50 of manganese dioxide, a binder, and graphite was compacted into place along the positive current collector and a non-woven nylon separator 49 was placed as shown in the figure. A metered amount of a standard gelled negative electrode mixture 51 of zinc powder, potassium hydroxide (approximately 45% solution of KOH) and carboxymethyl-cellulose was filled into the area inside the separator. A polypropylene (Avisun 4018) top 44 with a brass negative current collector 59 attached thereto was placed onto the can with the current collector embedded in the gelled negative electrode.

The assembled battery was then placed in the spin welding machine for sealing. The battery was held by means of an air activated clamping vise in an upright position and centered in relation to the driving face of the machine. A motor driven drive face is then lowered into engagement with the plastic top 44 and was rotated at a speed of 3450 r.p.m. Successful welding has been accomplished using rotational speeds from 2,000 to 6,000 r.p.m. and this range is not necessarily considered critical. The vertical force exerted by the driver face against the top was 100 pounds and the welding operation lasted approximately 0.5 second. An electronic timer caused the driver face to be released after welding takes place. By means of a pressure test, the radial butt weld was found not to fail at a pressure of 200 p.s.i. at which pressure stress orientations appeared in the can.

In the foregoing discussion there were illustrated two designs of batteries sealed within a plastic container of this invention. These particular designs are not to be considered as limitative of the scope of the invention, it being contemplated that those skilled in the art will be able to apply the teachings of this invention in various ways. In particular, the elements of the batteries in the two figures were assembled directly in the thermoplastic can. Since many batteries have metal cans which serve as both electrodes (or current collectors) and as housings for the batteries, it is contemplated that one of such assembled batteries may be placed in the thermoplastic container of this invention to provide an insulated and substantially leak-proof battery. Therefore, by applying the principles of this invention the thermoplastic container is sealed by spin welding with rotatable connect being maintained between a metallic contact, which passes through the thermoplastic top or closure, and a terminal of the assembled battery. It is intended therefore to include within the scope of this invention other modifications and embodiments which retain the spirit of this invention.

I claim:

1. A method of sealing an electric battery comprising arranging the battery electrodes, separator and electrolyte in a thermoplastic can which is open at one end, said can having a first metallic terminal passing therethrough and contacting one of said electrodes, closing said open end of said can with a thermoplastic top, said top having a second metallic terminal passing therethrough for contact with the current collector of the other of said electrodes, spin welding said top to said can to seal said battery by rapidly rotating the top with respect to the stationary can and creating frictional heat caused by the surfaces of the top rotating and rubbing against the can surfaces causing the plastic of the contacting surfaces to melt and fuse, and providing means for maintaining rotatable electrical contact between said second terminal and said current collector.

2. The method of claim 1 wherein said top is circular and said can is cylindrical and said top snaps into and closes said open end of said can in an interference fit so that said seal formed between said can and said top is a combined radial-butt seam weld.

3. A method of sealing an electric battery comprising placing the electrodes, separator and electrolyte of said battery into a thermoplastic can having an open end, said can having a first metallic terminal passing therethrough in contact with one of said electrodes, closing said open end of said can with a thermoplastic top by rapidly rotating the top with respect to the stationary can and creating frictional heat caused by the surfaces of the top rotating and rubbing against the can surfaces causing the plastic of the contacting surfaces to melt and fuse, said top having a second metallic terminal passing therethrough, said other electrode being made of a paste material, said second terminal having a metallic extension rapidly rotating within said other electrode during spin welding said top to said can to maintain electrical contact between said other electrode and said second terminal so that said second terminal serves as a contact for said other electrode to an external circuit.

4. The method of claim 3 wherein said can is cylindrical, said top is circular and snaps into and closes said open end of said can in an interference fit, and said seal formed between said top and said can is a radial-butt seam weld.

5. A method of sealing an electric battery, said battery having an outer casing housing the battery elements and having an electrode terminal at either end, comprising placing said battery into a thermoplastic can open at one end, said can having a first metallic contact passing through the bottom thereof and contacting one of said battery terminals, closing said open end of said can with a thermoplastic top, said top having a second metallic contact passing therethrough, spin welding said top to said can thereby forming a seal by rapidly rotating the top with respect to the stationary can and creating frictional heat caused by the surfaces of the top rotating and rubbing against the can surfaces causing the plastic of the contacting surfaces to melt and fuse and said second metallic contact being in rotatable contact with said other battery terminal.

References Cited

UNITED STATES PATENTS

| | | | |
|---|---|---|---|
| 3,245,858 | 4/1966 | Negoro | 264—68 XR |
| 3,261,516 | 7/1966 | Allen | 222—548 |
| 3,264,394 | 8/1966 | Gohl | 264—263 |
| 3,320,096 | 5/1967 | Jammet | 136—170 |
| 3,446,688 | 5/1969 | Flax | 264—68 XR |
| 3,468,732 | 9/1969 | Hewitt | 156—73 |

WINSTON A. DOUGLAS, Primary Examiner

A. SKAPARS, Assistant Examiner

U.S. Cl. X.R.

136—175, 169, 170; 156—69; 228—58; 264—68